United States Patent [19]

Day

[11] 3,745,407

[45] July 10, 1973

[54] DIGITAL CATHODE RAY TUBE INTENSITY-MODULATOR

[75] Inventor: Christopher C. Day, Newtonville, Mass.

[73] Assignee: American Optical Corporation, Southbridge, Mass.

[22] Filed: Nov. 9, 1970

[21] Appl. No.: 87,714

[52] U.S. Cl. ................ 315/30, 128/2.06 G, 315/22, 340/324 A, 128/2.06 R;2.06 G;2.06 V

[51] Int. Cl. ............................................. H01j 29/52

[58] Field of Search .......................... 315/18, 22, 30; 340/324 A

[56] References Cited

UNITED STATES PATENTS

| | | | |
|---|---|---|---|
| 3,343,030 | 9/1967 | Dragon et al. | 315/30 X |
| 3,603,967 | 9/1971 | Hauerback | 315/30 |
| 3,599,033 | 8/1971 | Stettiner et al. | 315/18 |

*Primary Examiner*—Carl D. Quarforth
*Assistant Examiner*—E. E. Lehmann
*Attorney*—William C. Nealon, Noble S. Williams, Robert J. Bird and Bernard L. Sweeney

[57] ABSTRACT

A digital cathode ray tube intensity-modulator. A digital intensity-modulator is disclosed for use in diaplay systems utilizing a cathode ray tube wherein at least one coordinate along the tube face defines a field of binarys. The modulator includes circuitry for providing binary numbers that represent instantaneous values of amplitude of input analog signals and further includes a device for intensity modulating the beam when it impinges at points on the tube face defined by the binary numbers. A trace enhancement device utilizing the above circuitry and a cathode ray tube meter with high and low limits are disclosed. The intensity modulator is applicable to many analog display systems and is particularly applicable to systems for displaying vital sign signals of a patient.

10 Claims, 8 Drawing Figures

PATENTED JUL 10 1973 3,745,407

INVENTOR.
CHRISTOPHER C. DAY
BY
William C. Healey
ATTORNEY

PATENTED JUL 10 1973 3,745,407

INVENTOR.
CHRISTOPHER C. DAY
BY William C. Walker
ATTORNEY

DIGITAL CATHODE RAY TUBE INTENSITY-MODULATOR

BACKGROUND OF THE INVENTION

1. Field of the Invention

The present invention relates generally to visual display systems. More particularly, the present invention relates to a digital intensity-modulator for use in a visual display system utilizing a cathode ray tube. The system can be used for displaying many types of analog signals, and is particularly adapted to the displaying of vital sign signals of a patient.

2. Description of Prior Art

Visual display systems using cathode ray tubes are well known in the electronics art. Additionally, cathode ray tube moving-display systems are well known in the art. A moving display, or precessing display, on a cathode ray tube gives a visual effect that is similar to the effect perceived by looking through an opening at a waveshape on a paper trace moving linearly behind the opening. The signal appears from one side of the opening or cathode ray tube, and moves linearly across the face of the tube or opening, and disappears from view at the opposite side of the tube or opening from which it entered.

There are various ways of achieving this moving display system. One of the prior art ways is to sample the input analog signal (in an ordinary sampler), convert the samples to a digital number (in an ordinary analog to digital converter), and apply each digital number or "word" to the cathode ray tube via an analog arrangement. One such arrangement requires that the number of line traces across the face of the tube and the number of words defining the input analog signal be unequal.

However, the prior art is not an all-digital processing shceme (after the initial analog to digital conversion). The prior art requires conversion from a digital number back to an analog signal for comparison in an analog fashion to determine when the beam of the cathode ray tube should be intensity-modulated. In a particular case, in the prior art, the output of an ultrasonic delay-line memory-loop is fed to shift registers wherein digital information is processed, but thereafter is fed to a digital to analog converter. The resulting analog signal is then compared with a ramp voltage, where the ramp voltage is proportional to the vertical displacement of the beam of the tube from a fixed horizontal axis. When coincidence between the two analog signals occurrs, the cathode ray tube beam is intensity-modulated. This is a weak feature of the prior art. The analog comparator of the prior art is beset by problems associated with most analog circuitry such as gain adjust, drift, zero setting, and non-linearity.

By comparison, the present invention permits processing of digital information withdrawn from its memory as digital information. The present invention does not require a second digital to analog conversion.

A further difference between the present invention and prior art, is that instead of using an ultrasonic delay line as a memory, the present invention uses a shift register (MOS) which acts as an effective delay line. The type of delay line used in the present invention is synced with the master system clock. Thus, this type of delay line has none of the inherent instability problems of the acoustic or ultrasonic delay line. For example, in the present invention, if the clock rate increases, the bit rate (through the memory) increases proportionally and the right bit always appears at the output of the memory at the right time. This was not the case with certain prior art.

The present invention, being all digital after the initial analog to digital conversion, provides a way of enhancing the trace of the signal on the face of the cathode ray tube. In the prior art, when utilizing coincidence between a ramp and a reference signal representative of the analog signal, one could not readily cause an extended brightening of the trace for a small tube-face displacement that would be variable and dependent upon the rate of increase or decrease of the signal. But in the present invention, because of the digital nature of the intensity modulating scheme, a circuit is disclosed for providing trace enhancement which is a distinct improvement over the trace available using analog means. Thus, applicant, in his present invention, provides solutions to many of the problems associated with prior art moving display systems using cathode ray tubes.

SUMMARY OF THE INVENTION

The present invention relates to a digital intensity modulator for use in a moving or a stationary display system utilizing a cathode ray tube. The intensity modulator is all digital. The input analog signal, after being converted by an analog to digital converter, is stored in a MOS shift register which cooperates as a precessing recirculating memory. The output from the memory is fed to at least one shift register, the capacity of which is equal to the number of bits corresponding to a digital word. At least two of such shift registers connected in series is required if trace enhancement is to be achieved.

The shift registers parallel transfer their digital information simultaneously to other digital circuitry, and to a counter or counters as the case may be. In the case of utilizing a single counter, it is counted down from the count placed into it by a 5 megahertz clock (not the master system clock). When the count reaches zero, the zero count is detected and circuitry for causing the intensity to be modulated is then enabled.

In the case of two counters, the same situation applies. Both counters are counted from their respective distinct counts to the predetermined zero count and since the distinct cound in each counter was different, the time required to count to zero is likewise different for each counter and is a function of clock rate. The counter which achieves the zero predetermined count first is the one which causes the intensity modulating circuitry to be enabled and the counter which reaches the zero predetermined count second is the one which causes the intensity modulating circuitry to be disabled. Thus, the C.R.T. trace is intensified for a period of time corresponding to the difference in distinct counts. This is the trace enhancement feature.

The distinct count in counter one and the other distinct count in counter two together represent two successive instantaneous values of input analog signal. In a particular embodiment, the counters are ordinary divide by two counters.

An advantage of the present invention is that it overcomes many of the problems associated with a non-digital intensity-modulator for use with a display system.

Another advantage of the present invention is that more than one input analog signal can be monitored. Multichannel operation is achieved by utilizing a comutator at the input, storing the data of each signal serially in the MOS shift register, and using the proper number of shift registers and counters to provide the number of intensity modulations in one line trace that correspond to the number of input analog signals being monitored.

It is, thus, an object of the present invention to provide an improved intensity modulator for use in a cathode ray tube display system.

It is a further object of the present invention to provide an all digital intensity modulator for use in a display system utilizing a cathode ray tube.

It is an additional object of the present invention to provide enhancement of a trace on the face of a cathode ray tube.

It is yet another object of the present invention to provide a cathode ray tube meter display.

Other objects and advantages of the present invention will become apparent to one having reasonable skill in the art after referring to the detailed description of the appended drawings in which:

DESCRIPTION OF THE PREFERRED EMBODIMENT

Figures 1, 2, 4, 5, 6, 7:
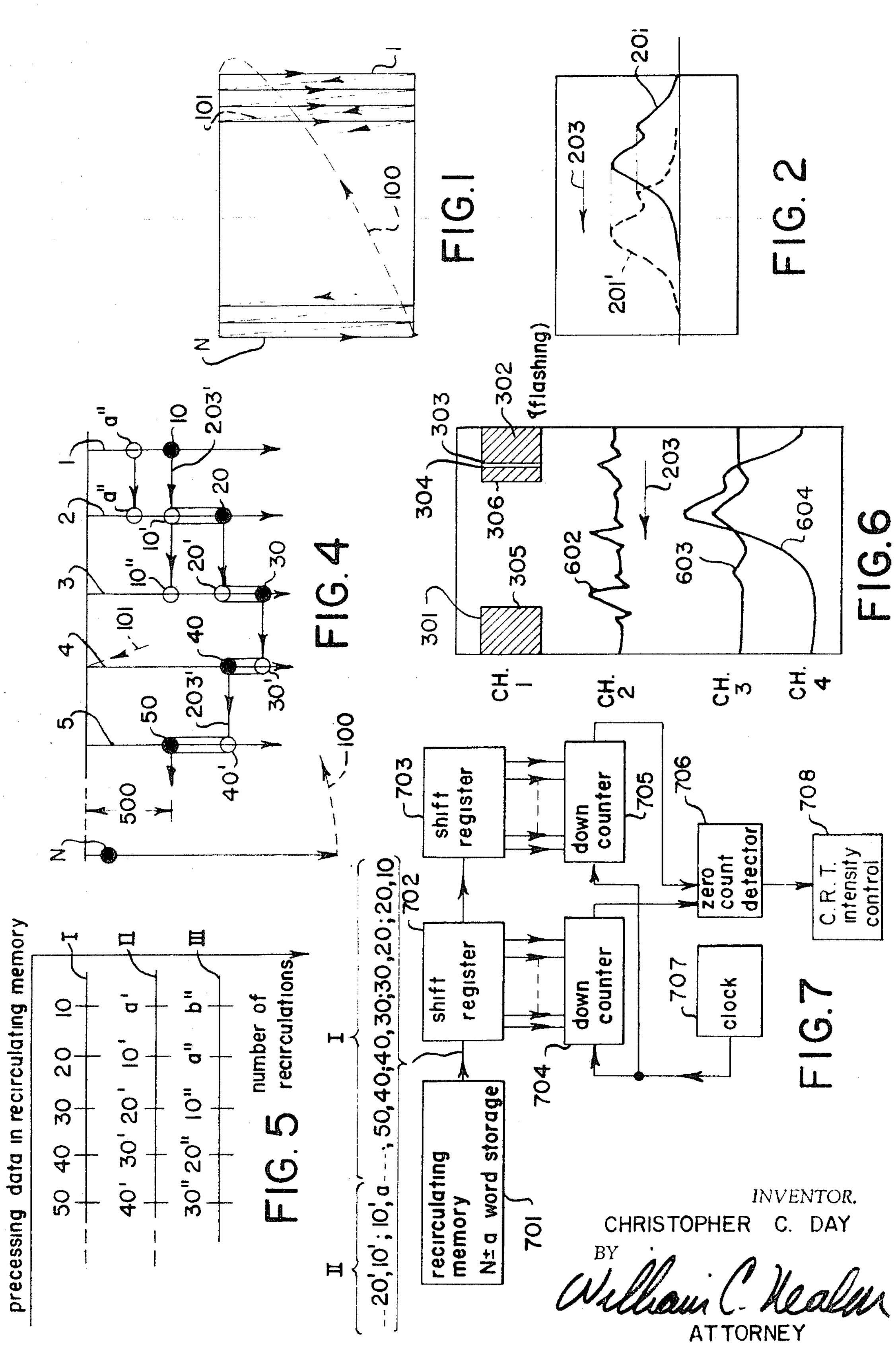
FIG. 1 is a schematic representation of the face of a cathode ray tube showing trace lines (solid) and retrace lines (dotted)
FIG. 2 depicts a typical wave shape displayed on the face of a cathode ray tube on which the trace is precessing to the left.
FIG. 4 depicts a few trace lines of the face of a cathode ray tube and shows points of intensity modulation.
FIG. 5 is a schematic representation of precessing data in a recirculating memory.
FIG. 6 depicts the face of a cathode ray tube on which is displayed four traces as provided by a particular embodiment of the present invention.
FIG. 7 is a block diagram of a particular illustrative embodiment of the present invention; and, FIG. 8 is a block diagram of a particular illustrative embodiment of the cathode ray tube meter.

FIG. 1 depicts deflection or sweep of an electron beam in a generally vertical direction on the face of a cathode ray tube. Trace 1 is the first line trace of the group, and trace N is the last line trace of the field of line traces. Retrace 101 is one of the retraces corresponding in number to N, and retrace 100 is in the field retrace from the N th line trace to line trace 1. The retraced lines are shown as dashed lines to indicate that they are blanked out during their occurrence. They are not visible on the tube face.

FIG. 2 depicts a precessing or moving display on a cathode ray tube of a typical wave-shape, (in this case intended to represent cardiac pressure). The motion of the display is in direction 203. Trace 201' represents the trace occurring later in time than trace 201. The wave-shape appears from the right-hand side of the tube and disappears at the left hand side. Alternatively, the wave-shape could be made to more in the opposite direction.

FIG. 4 is a detailed schematic of the manner in which trace enhancement is achieved. The vertical direction defines a field of binarys. A field of binarys is intended to mean that each point of intensification can be represented by a distinct binary number.

Dots 10, 20, 30, 40, and 50 represent the first five intensity modulation points on the cathode ray tube during its first five vertical traces. Because of wave-shape precession, for example as in FIG. 2, the points of intensity modulation are shifted to the left by one line trace with each new input of data to line trace No. 1. (Hereinafter, line trace, line, and trace are used interchangeably.) The shift of points of intensity modulation are indicated by direction 203'. Thus, circles 10', 20', 30', 40' also represent points of intensity modulation on lines 2, 3, 4, and 5. Trace enhancement results from maintaining beam intensity between points, for example, 10' and 20, and 20' and 30, 40 and 30', etc.

The lines in FIG. 4 are widely spaced for purposes of clarity of illustration. In reality, the traces are close to each other. The points of intensity modulation tend to overlap. This gives a continuous visual effect rather than the discrete effect depicted in FIG. 4.

Vertical distance 500 is a distance from some fixed base line to the binary number coordinate corresponding to intensity point 50. In the prior art, this vertical distance was achieved by analog means. In the present invention this vertical distance, as well as all other intensity point distances, are achieved solely by digital means. To best understand the operation of the device which accomplishes this result, one should consider FIG. 5 which is a schematic of precessing data in a recirculating memory, and FIG. 7 which is a block diagram of an illustrative embodiment of the present invention, in conjunction with FIG. 4.

In FIG. 7, recirculating memory 701 comprises an MOS shift register. It is fed binary bits from an analog to digital converter (not shown) of ordinary design. The analog to digital converter samples the input analog signal (not shown). In the event that several signals are to be displayed, a commutating device of ordinary design (not shown) would be used in conjunction with the analog to digital converter. Recirculating memory 701 stores digital data in the form of binary bits and recirculates the data. The number of available addresses for storage can be designed to be related to the incoming number of binary bits corresponding to one waveshape to cause precession of the bits within the memory. The number of addresses is unequal to the number of these bits when precession occurs.

The output of recirculating memory 701 provides serial binary data. A predetermined number of binary bits, for example, eight, determine a "word." A word is the amount of binary information required to determine at what point intensity modulation should occur. For example, in FIG. 4, on line 2, dot 20 represents a word of eight binary bits and dot 10' represents a different word of eight binary bits.

In FIG. 7, I (Roman Numeral One) encompases the first cycle of data in the recirculating memory. The notation (in inverted order), 10, 20; 20, 30; 30, 40; 40, 50; is intended to mean, for example, that shift register 703, during the sweep of line 2, stores the binary word corresponding to intensity modulation circle or point 10 and shift register 702 stores the binary word corresponding to intensity modulation point 20.

The shift registers are commanded to parallel transfer (command signal not shown) the binary words to down-counters 704 and 705. The counters register these words. The counters will then be counted down to a predetermined count at a predetermined rate. This is accomplished with clock 707. Down-counter 703 reaches a predetermined count (zero count) earlier than down-counter 704, since we are discussing the situation illustrated on line 2.

Circle 10' represents the beginning of intensity modulation, and is caused by detection of the zero count in counter 705 by zero count detector 706. Zero count detector 706 causes CRT intensity control 708 to actuate. A short time thereafter, counter 704 reaches its zero count and is again detected in zero count detector 706. Control 708 is then de-actuated and causes removal of intensity from the cathode ray tube.

In FIG. 7, referring to I (Roman Numeral One), consider the next set of data, i.e., 30, 20. This is intended to mean that shift register 702 now stores a binary word corresponding to intensity point 30 and shift register 703 now stores a word corresponding to intensity point 20. This situation occurs during the sweep of line 3. In this case, down-counter 705 again reaches zero earlier than down-counter 704, and intensity modulation begins at point 20' on line 3 and stope at point 30 on line 3. It is seen that data I continues to shift serially through shift registers 702 and 703, until all lines of the cathode ray tube have been swept.

The feature pointed out earlier with regard to no loss of synchronism when using an MOS shift register memory is significant. The master clock (not shown) relates rate of sampling of the analog signal, rate of circulation of data in memory 701, and the command signal to transfer data from the shift registers to the counters. Thus, it can be seen that if the rate shifts, it shifts for the entire system and always the correct bit appears at the output of memory 701 at the correct time.

After the data corresponding to I is cycled through the shift registers, the data corresponding to II appears. In FIG. 5, I represents recirculation I, II represents recirculation 2 and likewise III represents a recirculation of data for the third time in memory 701. New data put into the system is represented by $a'$. Thus, in II in FIG. 7, the first set of data to go into shift registers 703 and 702 respectively is $a'$ $N'$. During circulation 1, the first set of data to enter shift register 703 and 702 respectively were binary words corresponding to 10 and 20 which corresponded to line 2 in FIG. 4. In circulation II, it is seen that the binary words corresponding to intensity points 10 and 20 are 10', 20', and now appear in the shift registers during line 3. The apparent precession of the waveform across the screen is caused by this introduction of new data at the beginning of each recirculation. (Similarly, $b''$ is new data for recirculation III.)

Relating FIG. 4 and FIG. 7 once again, the displacement indicated by 500 in FIG. 4 is equivalent to binary 50. Again in circulation data I, shift register 702 will receive a binary word corresponding to intensity point 50 when shift register 703 receives a binary word corresponding to intensity point 40. This occurs during the fifth line trace. After counters 704 and 705 receive their respective distinct count, and after they are clocked by clock 707 down to zero, it is seen that zero count detector 706 will detect the count corresponding to intensity point 50 earlier than it will detect the count corresponding to intensity point 40'. Thus, displacement 500 in FIG. 4 is exactly equal to the binary number stored in down-counter 704 at the time of sweeping the fifth line. The vertical displacements in the field of binarys and binary or digital and not analog.

Clock 707 can be a variable clock and thus cause a smaller displacement from the horizontal for a higher clock rate or can cause a larger displacement from the horizontal for a lower clock rate.

Figure 8:
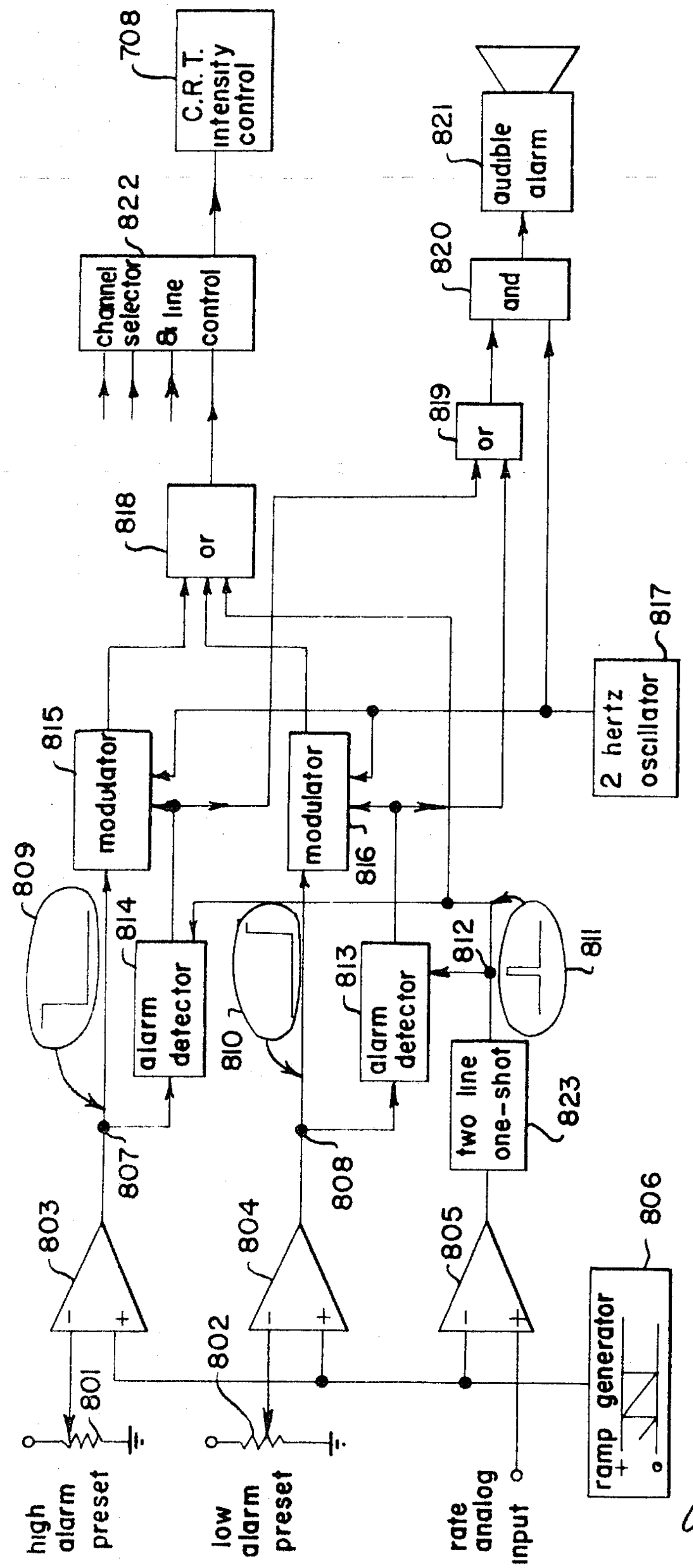

FIG. 8 depicts a block diagram of the meter display. Comparator 803 compares a high alarm preset voltage from potentiometer 801 with a calibrated ramp voltage from ramp generator 806. Comparator 804 compares a low alarm preset voltage from potentiometer 802 with the voltage from ramp generator 806. Comparator 805 compares a rate analog input voltage with the voltage from a ramp generator 806. The outputs from comparators 803 and 804 respectively go to inputs of modulator 815 and alarm detector 814, and modulator 816 and alarm detector 813. The wave-shapes appearing at junctions 807 and 808 are indicated by pictures 809 and 810. The output from comparator 805 is fed to a one shot multivibrator 823 which provides sufficient pulse width to encompass at least two lines. As shown, the pulse width depicted in picture 811 occurs, in time, between the high voltages in pictures 809 and 810. Thus, since alarm detectors 814 and 813 are basically and gates there is no output from either alarm detector for this depicted situation.

Figure 3:
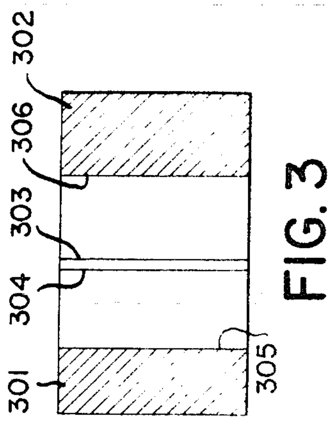
FIG. 3 depicts a cathode ray tube meter display, showing high and low limits, and a meter needle.

In FIG. 3, a cathode ray tube face comprises a meter. Vertical lines 303 and 304 represent the needle or movable indicator of this meter. Intensity modulation to provide this needle is caused by two line one shot 823 of FIG. 8. Cross-sectioned area 301 represents a lower limit and corresponds to the high voltage in picture 810. Cross-section 302 represents an upper limit and corresponds to the high voltage of picture 809. Both of these limits are variable and can be preset with potentiometers 801 and 802. Thus, line 305 can be moved to the left or right and line 306 can be moved to the left or right.

When looking at the tube face, one sees the cross-sectioned areas of FIG. 3 as being of moderate intensity and sees the lines 303 and 304 as a single brightness line of brighter or greater intensity than either of the limit areas. Lines 303 and 304, the needle, move left or right in response to the average rate of input signal appearing at comparator 805. When the meter needle moves far enough to the left or right so that the needle intersects either the lower or upper limit, the alarm mechanism to be described below is set off.

If the rate analog input had such a value that the one shot output occurred during the high level of picture 809, then a limit-excess occurs and alarm detector (and gate) 814 is enabled and provides inputs both to modulators 15 and to gate 819. The utput of gate 818 in combination with the output from two hertz oscillator 817 provide inputs to and gate 820. Gate 820 is enabled and provides audible alarm 821 with two cycle energization pulses for an audible alarm. Also, modulator 815 provides an interesting pulsation of limit excess on the face of the tube.

Modulator 815 has inputs of an upper limit, a meter needle location, and a two hertz oscillation. All of these signals are fed through or gate 818 which provides an input to CRT intensity control 708 via channel selector and line control 822. Thus, output of modulator 815, during the time when the needle is within upper limit 302 in FIG. 3 causes a moderate intensity background, with meter needle 303/304 having bright intensity superimposed thereon. Also, upper limit 302 is flashing (intensity modulating) at a two cycle per second rate.

Control 822 is used to indicate that more than one channel can be used at a time. For example, in FIG. 6, four channels are shown. These channels indicate that a channel overlapping is available. Channel four depicts a cardiac pressure wave. It is larger than other signals shown and overlaps channel three. Channel one depicts the cathode ray tube meter. The needle is depicted so that it causes high limit 302 to flash.

The invention may be embodied in other specific forms without departing from the spirit or essential characteristics thereof. For example, there could be an interlacing mechanism whereby the traces are interlaced. The face of the tube can be swept by lines 1, 3, 5, 7, etc., and then be reswept by lines 2, 4, 6, 8. This entails additional timing, blanking, and other circuitry.

Summarizing, the occurrence of the intensity on the cathode ray tube is displaced from a base line by an amount proportional to time required for a counter to count from a distinct input count to a predetermined count. This is a digital measurement and not an analog measurement because the time is not continuous. The time is measured in discrete amounts. Further, the 5 megahertz clock need not be a fixed rate. Thus, by using various rates, one can achieve amplitude increase or decrease of the display on the cathode ray tube.

By using a different clock rate with each pair of counters corresponding to one of the input signals, one can achieve overlap of one signal on top of the other. The overlap has a particular advantage when monitoring blood pressure because it is important to obtain as large a display as possible for accurate measurement. The present invention has this flexibility. A person's heartbeat and blood pressure waveform can be made to fill almost the entire tube face.

The essence of the invention can be derived from the disclosure herein presented without complications not related to the present invention. It is understood that more than four channels can be used, depending on the size of the display required and available. It should be understood that the present invention can be used with precessing or standing-still displays, where the precessing displays can move in any direction.

Thus, the present embodiments are to be considered; in all respects as illustrative and not restrictive, the scope of invention being indicated by the appended claims rather than by the foregoing description, and all changes which come withing the meaning and range of equivalency of the claims are therefore intended to be embraced therein.

I claim:

1. A digital intensity-modulator for use in a display system utilizing a cathode ray tube, at least one coordiante along the face of said tube defining a field of binarys, said system including means for providing binary bits corresponding to at least one input analog signal and a precessing recirculating memory for the storage of said binary bits, said intensity-modulator comprising:

digital means for providing binary numbers, each of said numbers representing an instantaneous value of amplitude of said one input analog signal, at least one of said numbers being provided with each sweep of the beam of said tube in the direction of said coordinate, said digital means further comprising serial digital means for repetitively serially reading out a predetermined number of bits from said memory and counter means for repetitively registering a distinct count corresponding to each said predetermined number of bits; and, modulating means responsive to operation of said digital means for repetitively intensity-modulating said beam when said beam impinges at a point on the face of said tube defined by one of said numbers said modulating means further comprising countdown means for repetitively counting from said distinct count to a predetermined count at a predetermined rate, detecting means for detecting the successive occurrences of each of said predetermined counts, and means responsive to each operation of said detecting means for modulating the intensity of said beam.

2. A digital intensity-modulator as recited in claim 1 and wherein said modulating means includes means for providing both a high limit and a low limit to an input analog signal value, means for comparing said signal value with said high limit and said low limit, means responsive to the operation of said comparing means for detecting said signal value exceeding said high limit and for detecting said signal value exceeding said low limit, vertical sweep needle meter means responsive to the operation of said detecting means for providing a meter indication of limit excess on said tube and responsive to the operation of said detecting means detecting said signal between said high limit and said low limit for providing a meter indication of value of said signal on said tube, said meter means further including means for flashing an indication of limit excess on said tube and for simultaneously activating an audio alarm.

3. A digital intensity-modulator as recited in claim 1, and wherein said countdown means further comprises a clock oscillator and at least one counter.

4. A digital intensity-modulator as recited in claim 1, and wherein said serial digital means comprises at least one shift register.

5. A digital intensity-modulator as recited in claim 1 and wherein said countdown means comprises a clock oscillator, a predetermined number of pairs of counters, and wherein said serial digital means comprises said predetermined number of pairs of shift registers connected serially, each of said counters connected in parallel with one of said shift registers.

6. A digital intensity-modulator as recited in claim 6 including means for parallel transferring of said distinct count from each of said shift registers to each of said counters respectively, and further including means for simultaneously clocking each of said counters from each respective distinct count to said predetermined count.

7. A digital intensity-modulator as recited in claim 6 and further including means for providing intensity modulation to said beam at occurrence of each of said predetermined counts corresponding to the lower of the two distinct counts of each of said pairs of said counters, and for removing intensity modulation from said beam at occurrence of each of said predetermined counts corresponding to the higher of the two distinct counts of each of said pairs of said counters.

8. A digital intensity-modulator as recited in claim 7 and further including means for providing intensity modulation to said beam at occurrence of each of said predetermined counts corresponding to the higher of the two distinct counts of each of said pairs of counters, and for removing intensity modulation from said beam at occurrence of each of said predetermined counts corresponding to the lower of the two distinct counts of each of said pairs of said counters.

9. A digital intensity-modulator as recited in claim 1, and wherein said serial digital means comprises two shift registers connected serially, and wherein said countdown means comprises two counters each connected in parallel with one of said shift registers, said modulator further including means for parallel tranferring of said distinct count from each of said two shift registers to each of said two counters respectively, and a clock oscillator including means for simultaneously clocking said two counters from each of the two respective distinct counts to said predetermined count, said modulator further including means for providing intensity modulation to said beam at occurrence of said predetermined count corresponding to the one of said distinct counts, and for removing intensity modulation from the beam of said tube at the occurrence of said predetermined count corresponding to the other of said distinct counts.

10. A digital intensity-modulator as recited in claim 8, and wherein said clock oscillator includes means for controlling the rate of said oscillator.

* * * * *